(12) United States Patent
Lin

(10) Patent No.: US 10,828,947 B2
(45) Date of Patent: Nov. 10, 2020

(54) PUMP ASSEMBLY FOR WHEEL

(71) Applicant: The Goodyear Tire & Rubber Company, Akron, OH (US)

(72) Inventor: Cheng-Hsiung Lin, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 72 days.

(21) Appl. No.: 16/223,282

(22) Filed: Dec. 18, 2018

(65) Prior Publication Data

US 2019/0184777 A1  Jun. 20, 2019

Related U.S. Application Data

(60) Provisional application No. 62/607,412, filed on Dec. 19, 2017.

(51) Int. Cl.
| | |
|---|---|
| *B60C 23/12* | (2006.01) |
| *F04B 41/06* | (2006.01) |
| *B60C 23/00* | (2006.01) |
| *F04B 45/10* | (2006.01) |
| *F04B 45/047* | (2006.01) |

(52) U.S. Cl.
CPC .......... *B60C 23/12* (2013.01); *B60C 23/004* (2013.01); *F04B 41/06* (2013.01); *F04B 45/047* (2013.01); *F04B 45/10* (2013.01)

(58) Field of Classification Search
CPC ........ F04B 45/10; F04B 45/04; F04B 45/047; F04B 41/06; B60C 23/001; B60C 23/004; B60C 23/10; B60C 23/12
See application file for complete search history.

(56) References Cited

U.S. PATENT DOCUMENTS

| 6,533,010 B1 * | 3/2003 | Alonso | B60C 23/004 |
| | | | 152/415 |
| 8,807,182 B2 | 8/2014 | Kelly | |
| 2010/0288411 A1 * | 11/2010 | Loewe | B60C 23/043 |
| | | | 152/419 |

(Continued)

FOREIGN PATENT DOCUMENTS

JP         2010095165         4/2010

OTHER PUBLICATIONS

European Search Report for Serial No. EP18212048.5 dated Apr. 23, 2019.

(Continued)

*Primary Examiner* — Bryan M Lettman
(74) *Attorney, Agent, or Firm* — June E. Rickey

(57) ABSTRACT

A pumping mechanism in accordance with the present invention is used with a pneumatic tire mounted on a wheel to keep the pneumatic tire from becoming underinflated. The pumping mechanism includes a frame having a first chamber and a pump chamber, a strike plate positioned in the first chamber and being connected to a plunger plate, said plunger plate having a nose for engagement with a diaphragm mounted in the pump chamber; said pump chamber being in fluid communication with a pump inlet and a pump outlet; wherein actuation of the strike plate in the first chamber causes engagement of the nose with the diaphragm. Preferably the strike plate is actuated by a permanent magnet mounted on a stationary part, or the strike plate is actuated by an electrically driven magnet.

15 Claims, 7 Drawing Sheets

(56) References Cited

U.S. PATENT DOCUMENTS

2014/0096881 A1    4/2014  Loewe
2015/0147198 A1*  5/2015  Chawla .................. B60C 23/12
                                                            417/328
2015/0314658 A1*  11/2015  Lin ........................ B60C 23/12
                                                            152/419

OTHER PUBLICATIONS

European Search Report for Serial No. EP18212732.4 dated May 24, 2019.

* cited by examiner

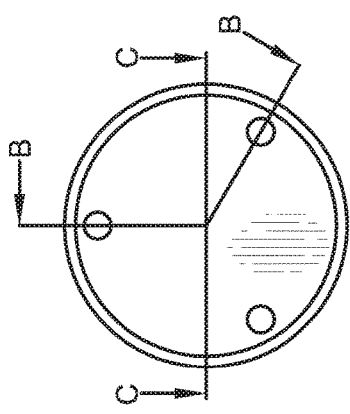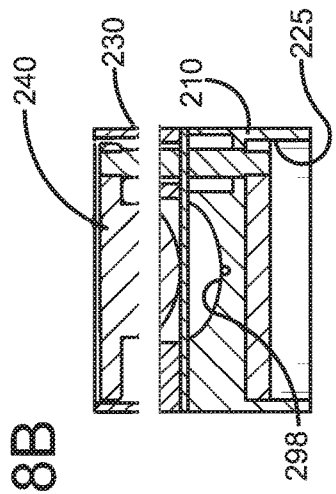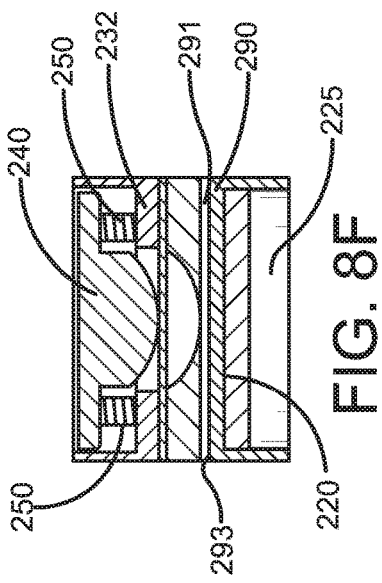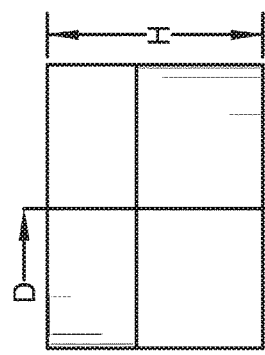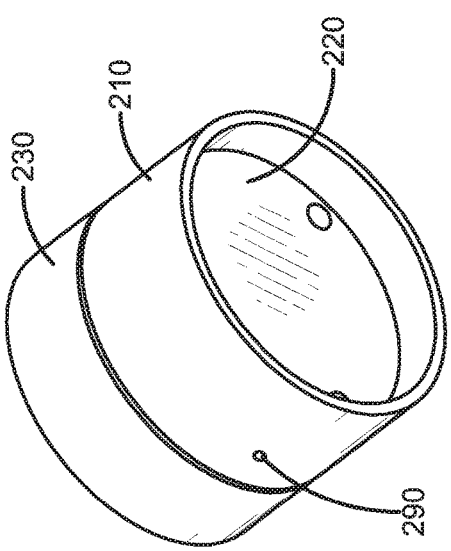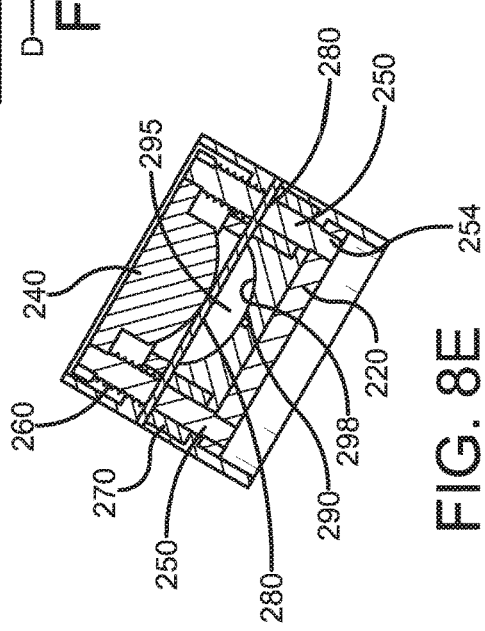

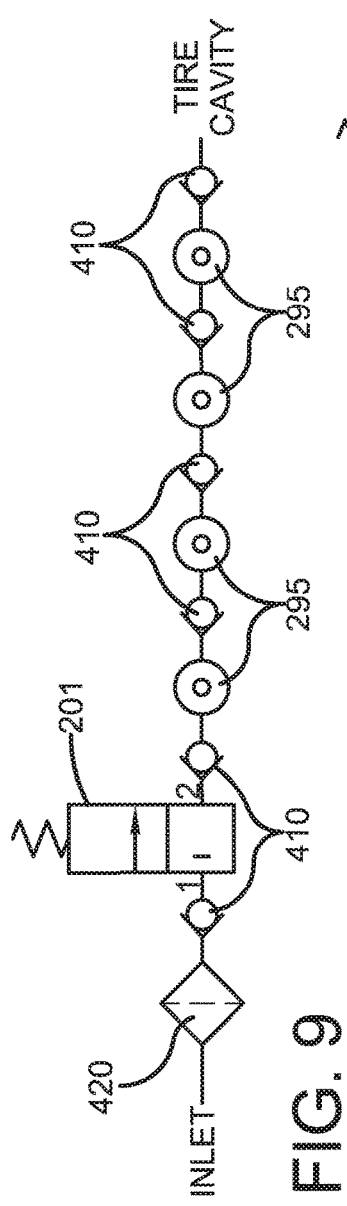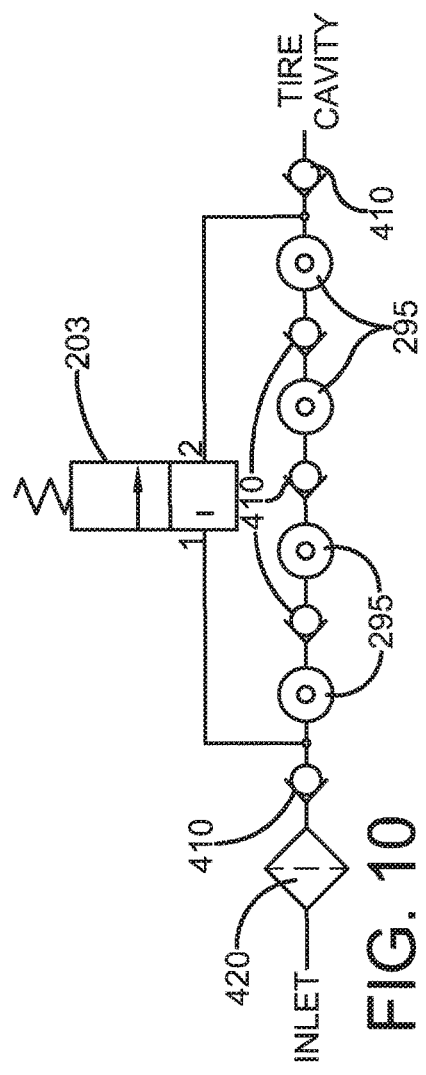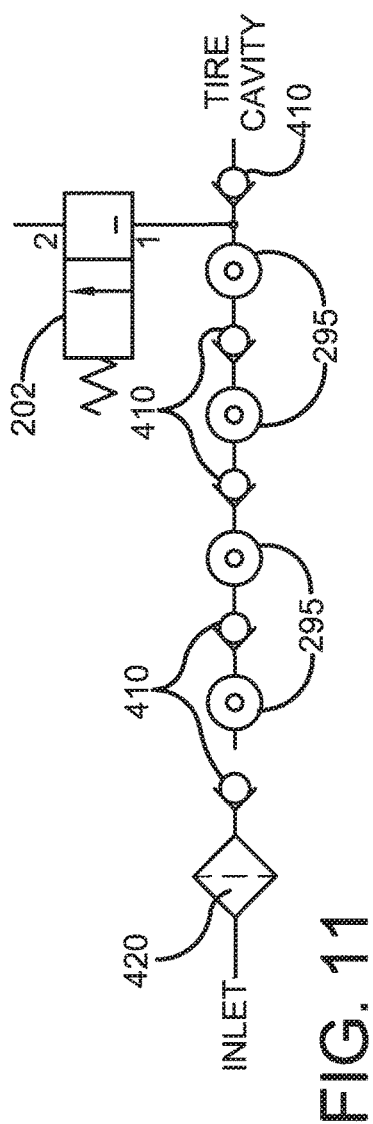

PUMP ASSEMBLY FOR WHEEL

FIELD OF THE INVENTION

The present invention relates to a pump system and method for maintaining appropriate air pressure within a pneumatic tire. More specifically, the present invention relates to a wheel mounted system for directing air into a tire cavity of a pneumatic tire.

BACKGROUND OF THE INVENTION

Conventional pneumatic tires are designed to perform for relatively long periods of time. In many cases, automobile tires are now expected to have a long useful service life. However, even long-life pneumatic tires are subject to air pressure losses due to puncture by nails and other sharp objects, temperature changes, and/or diffusion of air through the tire itself.

Since air diffusion reduces tire pressure over time, the pneumatic tires are often continually underinflated. Accordingly, drivers must repeatedly act to maintain tire pressures or fuel economy, tire life, and/or vehicle braking and handling performance will be reduced. Tire Pressure Monitoring Systems (TPMS) have been proposed to warn drivers when tire pressure is significantly low. Such systems, however, remain dependent upon a driver taking remedial action, when warned, to re-inflate a tire to the recommended pressure. It is desirable, therefore, to incorporate an air maintenance feature within a pneumatic tire that will maintain recommended air pressure without requiring bothersome driver intervention.

While pumping systems have been proposed, many are often too mechanically complex and costly as well as too bulky and heavy to commercialize. In addition, consumers are not willing to pay for an expensive pump system. Thus, an improved, low cost pump design that is simple, and easy to install is desired. The pump system must have a low-profile design so that is does not interfere with the mounting of the tire or other mechanical components.

SUMMARY OF THE INVENTION

A pumping mechanism in accordance with the present invention is used with a pneumatic tire mounted on a wheel to keep the pneumatic tire from becoming underinflated. The pumping mechanism includes a frame having a first chamber and a pump chamber, a strike plate positioned in the first chamber and being connected to a plunger plate, said plunger plate having a nose for engagement with a diaphragm mounted in the pump chamber; said pump chamber being in fluid communication with a pump inlet and a pump outlet; wherein actuation of the strike plate in the first chamber causes engagement of the nose with the diaphragm. Preferably the strike plate is actuated by a permanent magnet mounted on a stationary part, or the strike plate is actuated by an electrically driven magnet.

DETAILED DESCRIPTION OF DRAWINGS

The following drawings are illustrative of examples of the present invention.

FIG. 8A is a perspective view of the pump of FIG. 7;

FIG. 8B is a top view of the pump of FIG. 7;

FIG. 8C is a side view of the pump of FIG. 7;

FIG. 8D is a cross-sectional view of the pump of FIG. 7 in the direction D-D of FIG. 8C;

FIG. 8E is a cross-sectional view of the pump of FIG. 7 in the direction B-B of FIG. 8B;

FIG. 8F is a cross-sectional view of the pump of FIG. 7 in the direction C-C of FIG. 8B;

FIG. 9 is a schematic view of the pump system with the pumps in series with inlet control;

FIG. 10 is a schematic view of the pump system with the pumps in series with bypass control;

FIG. 11 is a schematic view of the pump system with the pumps in series with outlet control;

DETAILED DESCRIPTION OF EXAMPLES OF THE PRESENT INVENTION

Figure 1:
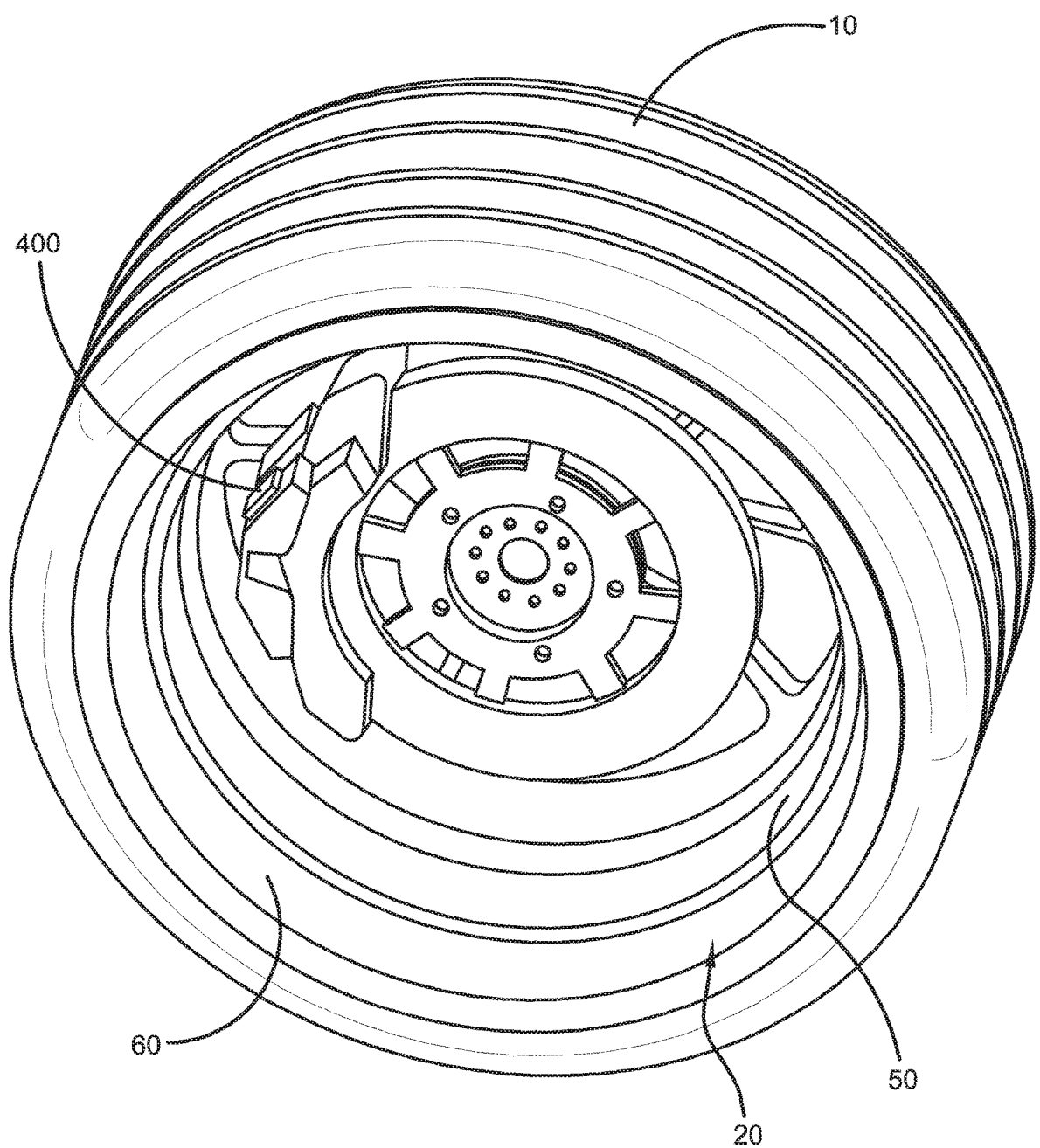
FIG. 1 is a perspective view of a wheel and pump system of the present invention.
Figure 3:
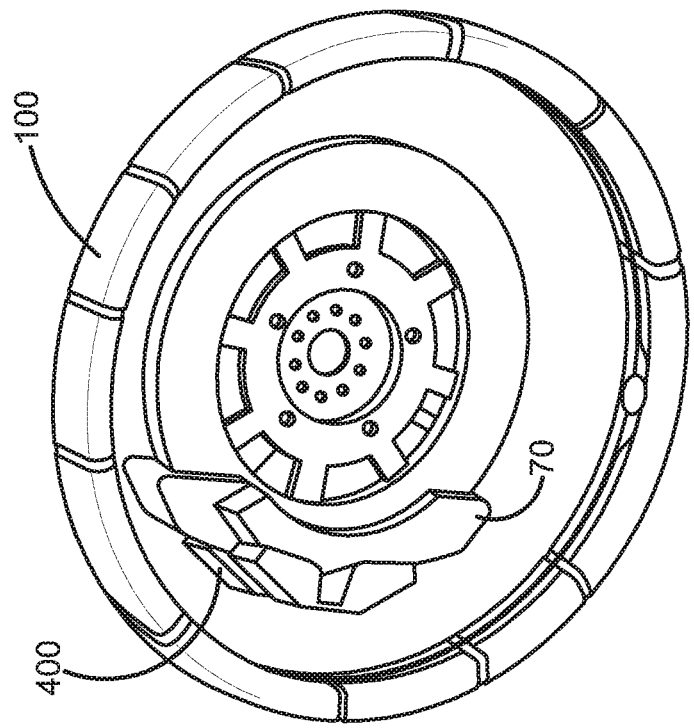
FIG. 3 is a perspective view of the pump system of FIG. 2 with parts of the wheel removed for clarity.
Figure 2:
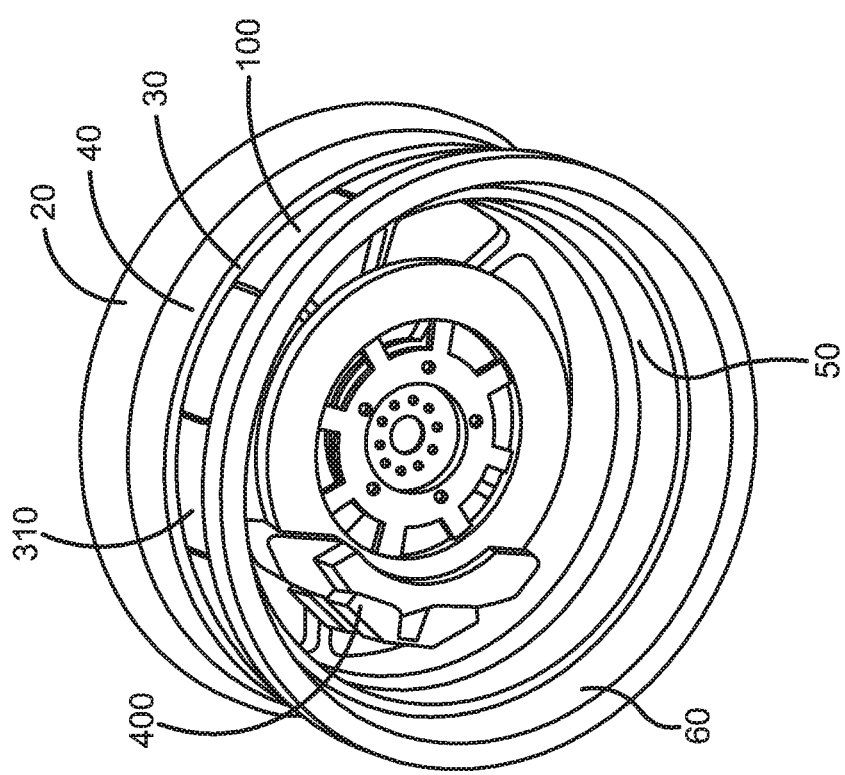
FIG. 2 is a perspective view of the wheel of FIG. 1 shown with the tire removed.

FIGS. 1 through 3 illustrate a wheel 20 which houses a low-profile pump system 100 of the present invention. A conventional tire 10 is mounted on the wheel and encloses the pump system in the tire cavity. As shown in FIG. 2, the wheel 20 may be conventional. Preferably, the wheel 20 is modified to include a groove 30 located on the rim flange 40. The groove is preferably U shaped? The low-profile pump system 100 is preferably received in the groove 30. The pump system housing is designed to have a snap in fit in the groove 30. A snap in insert 50 conceals the pump system on the outer wheel surface 60. FIG. 3 illustrates the low-profile pump system and its location in relation to the brake system 70, wherein certain wheel parts were removed for clarity. Preferably, the low-profile pump system 100 includes one or more low profile pumps 200. Each low-profile pump 200 is mounted in a housing 300. The outer surface 310 of the pump housing is preferably flush with the rim flange 40. The low-profile pump 200 is designed to have a minimal height H in the radial direction when the pump is mounted on the rim flange. The radial height H of each pump is preferably minimized.

Figure 7:
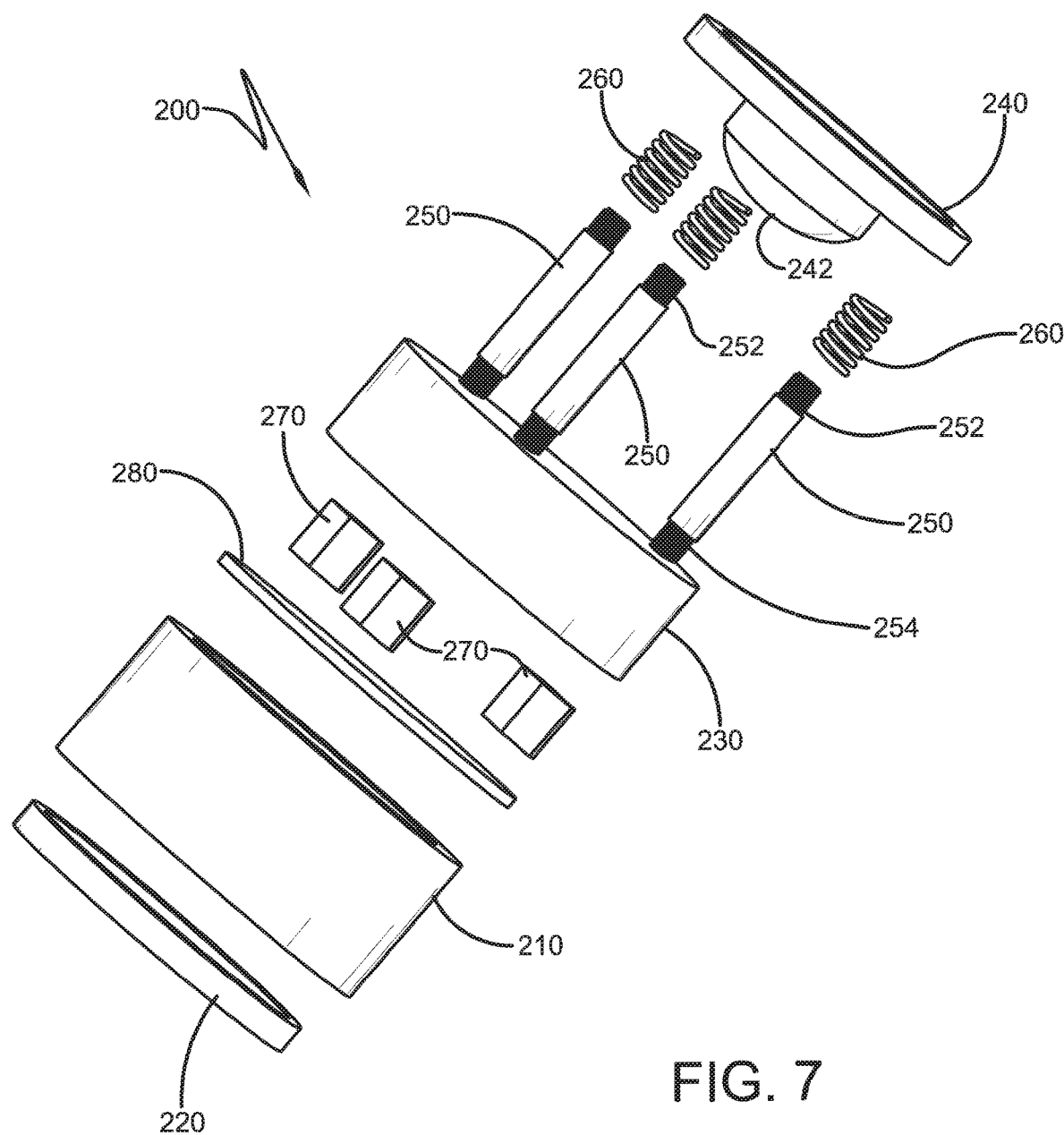
FIG. 7 is an exploded view of the pump of the present invention.

As shown in FIGS. 7 and 8E, the low-profile pump 200 includes a lower frame 210 that is joined to an upper frame 230 via one or more guide rods 250. The one or more guide rods 250 are received in aligned holes located in the upper and lower frame. Bearing sleeves 270 are positioned about the guide rods 250. A first end 252 of the guide rod 250 is secured to a plunger plate 240. The plunger plate 240 has a large bulbous nose 242 that protrudes from the lower end of the plunger plate 240. A resilient spring 260 is positioned between the plunger plate 240 and an internal surface 232 of the upper frame 230. The spring 260 biases the plunger plate 240 in an open position away from the lower frame 210. The guide rod 250 has a second end 254 that is secured to a steel strike plate 220.

The steel strike plate 220 is driven to reciprocate in the chamber 225 by the magnet 400 in the lower end of lower frame 210. Reciprocation of the strike plate 220 results in reciprocation of the guide rods 250 and the plunger plate 240. The bulbous nose 242 of the plunger plate engages a flexible diaphragm 280 positioned between the upper and lower frame. The flexible diaphragm 280 is positioned in a pump chamber 295 formed between a curved surface 298 of the lower frame 210 and plunger plate 240. Air in the pump chamber 295 is compressed by the diaphragm. A channel 290 is shown in FIGS. 8e and 8F, and is located at the bottom of the pump chamber 295. The channel has an inlet end 291 that feeds air into the pump chamber 295, and an outlet end 293 that exits the pump.

The driving force of the pump 200 may be a permanent magnet 400 that is placed on a fixed position near the wheel, such as the brake system or suspension system as shown in FIG. 3. As shown in FIGS. 2-3, the pumps are arranged so that the strike plate is in communication with the permanent magnet 400. Preferably, the strike plate faces the permanent magnet 400. Multiple permanent magnets 400 may be used at spaced apart intervals.

If a permanent magnet 400 is used, then the control of the pumping action may be from inlet control 201 as shown in FIG. 9, bypass control 203 as shown in FIG. 10, and outlet control 202 as shown in FIG. 11.

Figure 12A:
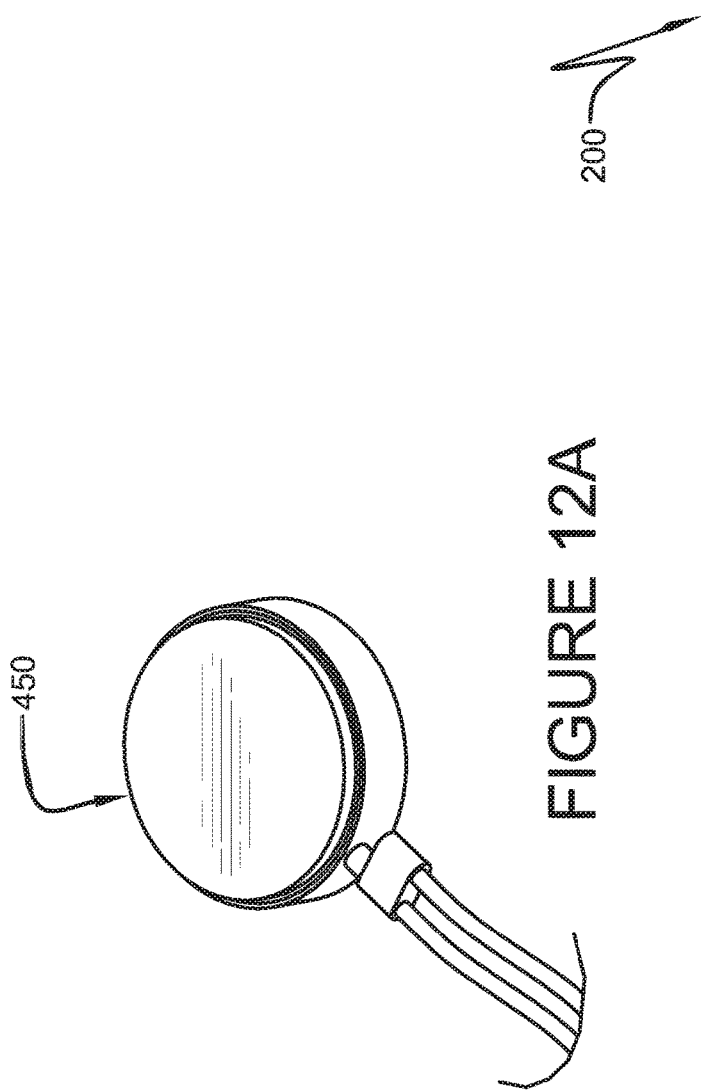
FIG. 12A is a perspective view of an electro magnet suitable for use with the present invention.
Figure 12B:
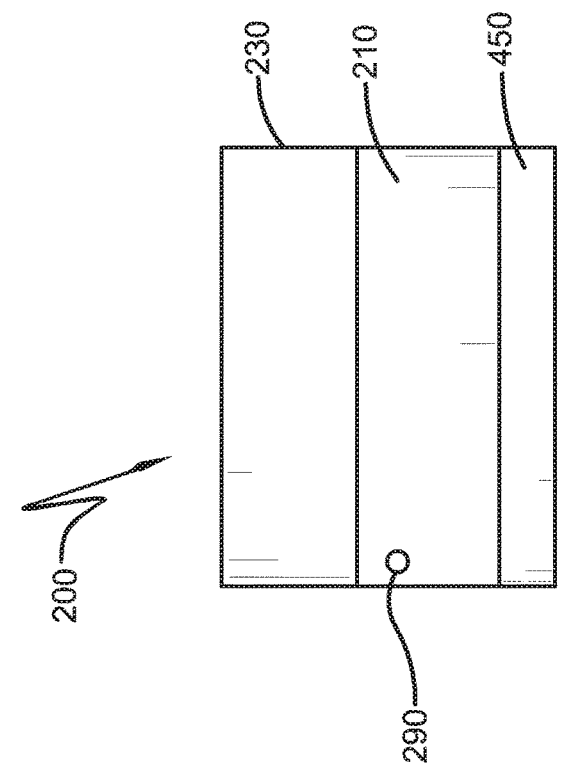
FIG. 12B is a side view of the pump with the electromagnet.

The driving force of the pump may also be from an electric magnet 450 capable of being switched on and off as shown in FIG. 12a. If an electric magnet 450 is used, then the pumping action is controlled by the energized action (on/off) of the electric magnet. The electric magnet 450 is preferably positioned adjacent the strike plate as shown in FIG. 12B.

Figure 4:
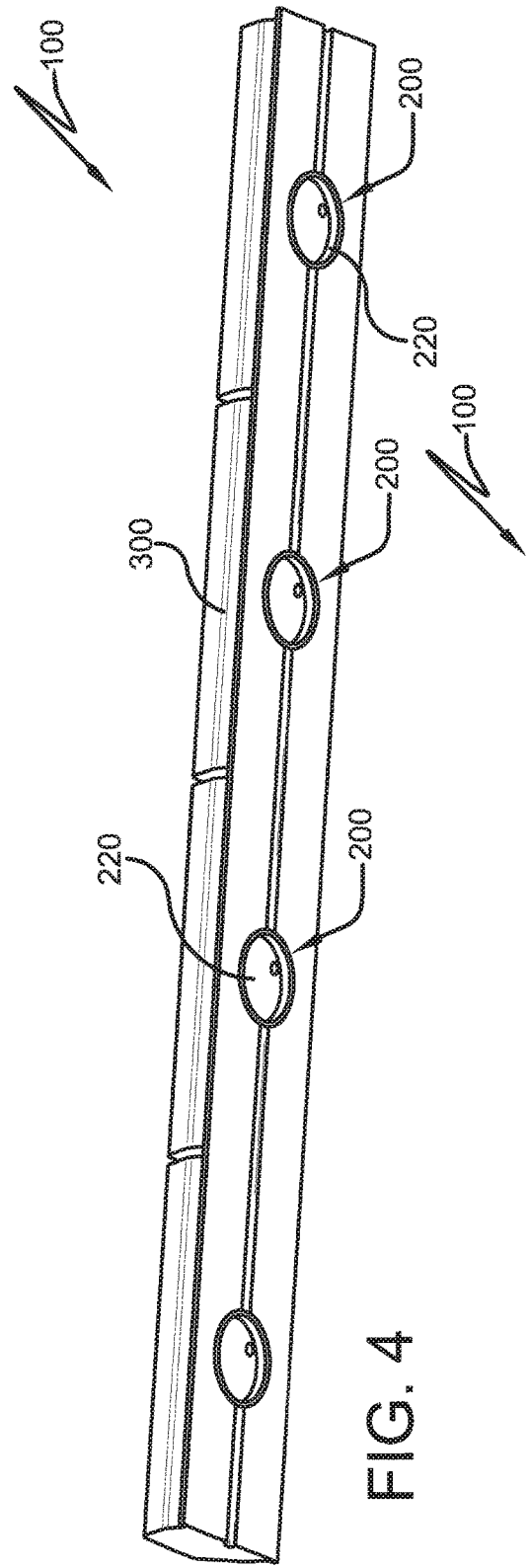
FIG. 4 is a schematic representation of a bottom view of the pump system.
Figure 5:
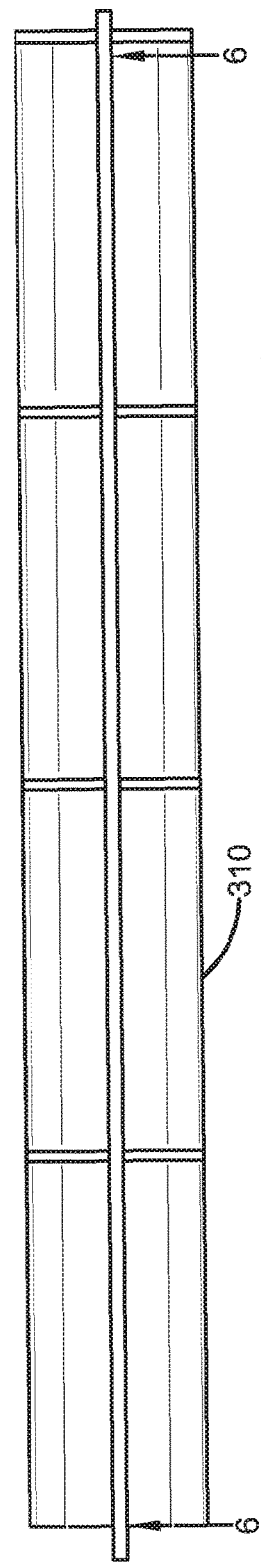
FIG. 5 is a top view of the pump system of FIG. 4.
Figure 6:
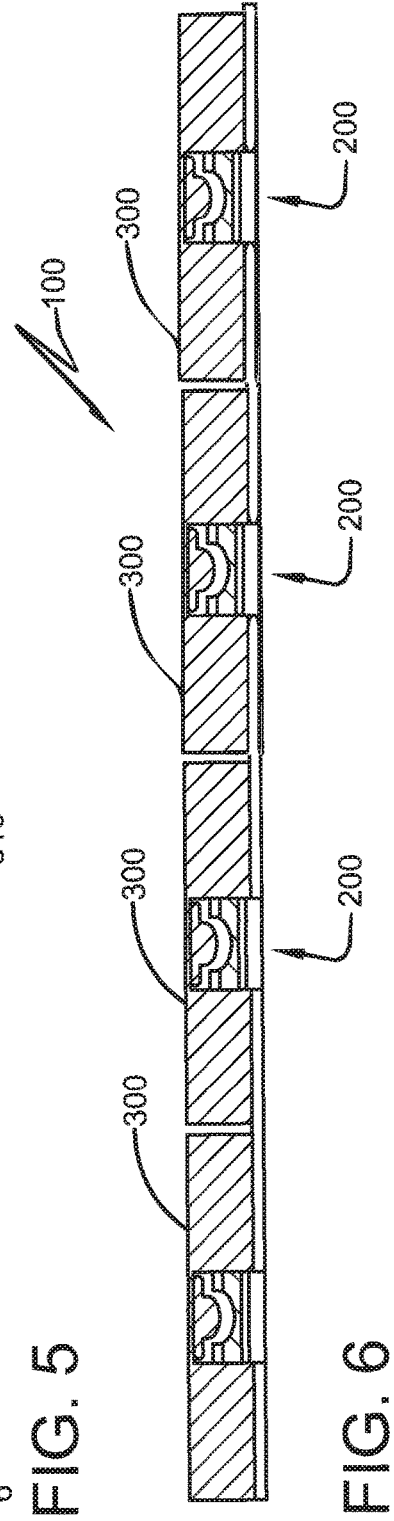
FIG. 6 is a cross sectional view in the direction 6-6 of FIG. 5.

As shown in FIGS. 4-6, the pump system preferably includes a plurality of pumps 200 that are arranged in series. As shown in FIGS. 9-11, the pump chambers 295 are arranged in series, so that the outlet of a first pump chamber is fed into the inlet of an adjacent pump chamber. Preferably, a check valve 410 may be located between each of the pump chamber connections to prevent backflow. The pump system may also include a filter 420. The air enters the pump system from a passageway in the valve stem, or via an air tube providing fluid communication of the outside air into the pump. The pump exits the last pump outlet into the tire cavity.

In an alternate embodiment, any of the one or more pumps may be arranged in a groove on the wheel outside of the tire.

In an alternate embodiment, the driving force may be from the rotational energy of the wheel imparting energy to the strike plate or plunger plate. The mass of the strike plate or plunder sized to actuate as the wheel rotates. No magnet is needed.

Due to an amplification effect, the compression of the pump driving mechanism may be defined as:

$$R=(r)^{2n}$$

where
R: system compression ratio
r: single chamber press
n: number of pump in the system Thus, a high compression ratio for each pump 500 is not necessary to achieve a high compression ratio (e.g., low force and/or deformation may produce high compression).

The low-profile pump system as described herein have the advantage of a simple, low cost system that is easy to install on a wheel, and solves the problem of low tire pressure. The system is light, durable and provides a high driving force. The system may be used on consumer and commercial truck systems.

While certain representative examples and details have been shown for the purpose of illustrating the present invention, it will be apparent to those skilled in this art that various changes and modifications may be made therein without departing from the spirit or scope of the present invention.

What is claimed:

1. A pump mechanism for mounting on a wheel to keep a pneumatic tire from becoming underinflated, the pump mechanism comprising:
    a frame having a first chamber and a pump chamber; said pump chamber being in fluid communication with a pump inlet and a pump outlet;
    a strike plate positioned in the first chamber and being connected to a plunger plate by one or more guide rails;
    said plunger plate having a nose for engagement with a diaphragm forming a wall of the pump chamber; wherein a spring is positioned between the plunger plate and the frame for biasing the plunger plate away from the frame;
    and
    wherein actuation of the strike plate in the first chamber causes engagement of the nose with the diaphragm.

2. The pump mechanism of claim 1 wherein the pump chamber is formed from a curved surface of the interior surface of the frame.

3. The pump mechanism of claim 1 wherein the pump is mounted on the rim flange.

4. The pump mechanism of claim 1 wherein the pump utilizes gravitational force changes during rotation of the pneumatic tire as a driving force.

5. The pump mechanism as set forth in claim 1 wherein the strike plate is actuated by a permanent magnet.

6. The pump mechanism of claim 5 wherein the permanent magnet is mounted on a brake caliper.

7. The pump mechanism as set forth in claim 1 wherein the load on the pneumatic tire does not affect a frequency of a pumping action of the pumping mechanism.

8. The pump mechanism of claim 1 wherein the strike plate is actuated by an electromagnet.

9. The pump mechanism as set forth in claim 1 further comprising a second pump having a second pump chamber, wherein the pump outlet of the first pump chamber is connected in series to an inlet of the second pump chamber.

10. The pump mechanism as set forth in claim 9 wherein the control valve is disposed in a bypass of the pumps.

11. The pump mechanism as set forth in claim 1 wherein the pump is mounted into a housing that is snap fit into a groove of the rim.

12. The pump mechanism as set forth in claim 1 further including a check valve.

13. The pump mechanism as set forth in claim 1 further including a control valve unit.

14. The pump mechanism as set forth in claim 1 wherein the control valve is disposed at an air inlet to the pump.

15. The pneumatic tire as set forth in claim 1 wherein the control valve is disposed at an air outlet of the pump.

* * * * *